United States Patent
Redding

(10) Patent No.: US 12,024,442 B2
(45) Date of Patent: Jul. 2, 2024

(54) MODIFIED ACTIVATED CARBON AND METHODS OF USING SAME

(71) Applicant: Evoqua Water Technologies LLC, Pittsburgh, PA (US)

(72) Inventor: Adam M. Redding, State College, PA (US)

(73) Assignee: Evoqua Water Technologies LLC, Pittsburgh, PA (US)

( * ) Notice: Subject to any disclaimer, the term of this patent is extended or adjusted under 35 U.S.C. 154(b) by 428 days.

(21) Appl. No.: 17/268,448

(22) PCT Filed: Aug. 14, 2019

(86) PCT No.: PCT/US2019/046540
§ 371 (c)(1),
(2) Date: Feb. 12, 2021

(87) PCT Pub. No.: WO2020/037061
PCT Pub. Date: Feb. 20, 2020

(65) Prior Publication Data
US 2021/0179449 A1 Jun. 17, 2021

Related U.S. Application Data

(60) Provisional application No. 62/718,764, filed on Aug. 14, 2018.

(51) Int. Cl.
*C02F 1/28* (2023.01)
*B01J 20/20* (2006.01)
(Continued)

(52) U.S. Cl.
CPC ............... *C02F 1/283* (2013.01); *B01J 20/20* (2013.01); *C01B 32/36* (2017.08); *C02F 1/288* (2013.01);
(Continued)

(58) Field of Classification Search
CPC ....... C01B 32/36; C01B 32/30; C01B 32/354; C02F 1/283; C02F 1/288; C02F 1/28;
(Continued)

(56) References Cited

U.S. PATENT DOCUMENTS 5,767,060 A * 6/1998 Hanrahan ................ B01J 20/20
210/502.1
7,297,267 B2 * 11/2007 Denton .............. B01D 17/0202
210/317
(Continued)

FOREIGN PATENT DOCUMENTS

CN 101481155 A * 7/2009
CN 102068961 A * 5/2011
(Continued)

OTHER PUBLICATIONS

Pan G, Jia C, Zhao D, You C, Chen H, Jiang G. Effect of cationic and anionic surfactants on the sorption and desorption of perfluorooctane sulfonate (PFOS) on natural sediments. Environmental Pollution, 2009, 157(1): 325-330 (6 pages). (Year: 2009).*
(Continued)

*Primary Examiner* — Joseph W Drodge

(57) ABSTRACT

Modified activated carbon is disclosed for use in water treatment. In at least some embodiments, activated carbon may be treated with a positively-charged surfactant, i.e. a quaternary ammonium-based surfactant, to promote the removal of poly- and perfluorolkyl substances from water.

19 Claims, 2 Drawing Sheets

(51) Int. Cl.
*C01B 32/36* (2017.01)
*C02F 101/36* (2006.01)

(52) U.S. Cl.
CPC ...... *C01P 2006/16* (2013.01); *C02F 2101/36* (2013.01)

(58) Field of Classification Search
CPC .............. C02F 2101/36; C02F 2101/40; C02F 101/36; C02F 2305/04; C01P 2006/16; B01J 20/20; B01J 20/46; B01J 2020/56
See application file for complete search history.

(56) References Cited

U.S. PATENT DOCUMENTS

| | | | | |
|---|---|---|---|---|
| 7,514,004 | B1 * | 4/2009 | Brady | C02F 1/28 210/688 |
| 9,394,179 | B2 | 7/2016 | Luan et al. | |
| 2006/0102562 | A1 * | 5/2006 | Cannon | B01J 20/3255 210/681 |
| 2006/0183812 | A1 * | 8/2006 | Miller | B01J 20/324 523/102 |
| 2011/0139701 | A1 | 6/2011 | Pearks et al. | |
| 2013/0168321 | A1 * | 7/2013 | Cannon | B01J 20/3248 210/683 |
| 2013/0316433 | A1 | 11/2013 | Huang | |
| 2016/0302479 | A1 | 10/2016 | Luan et al. | |
| 2017/0297926 | A1 * | 10/2017 | Nickelsen | B01J 41/05 |
| 2018/0207342 | A1 | 7/2018 | Friederichs et al. | |
| 2020/0316560 | A1 * | 10/2020 | Distefano | B01J 20/041 |

FOREIGN PATENT DOCUMENTS

| | | | | | |
|---|---|---|---|---|---|
| CN | 106046279 | A | * | 10/2016 | ............ B01J 20/268 |
| JP | 2002282848 | A | * | 10/2002 | |
| WO | WO-2006047613 | A2 | * | 5/2006 | ............ B01D 15/00 |
| WO | 2018035474 | A1 | | 2/2018 | |
| WO | WO-2018027273 | A1 | * | 2/2018 | ............ B01J 20/20 |

OTHER PUBLICATIONS

Appleman et al., "Treatment of poly- and perfluoroalkyl substances in U.S. full-scale water treatment systems", published in Water Research, vol. 51, 2014, pp. 246-255. (Year: 2014).*
Rahman et al., "Behaviour and fate of perfluoroalkyl and polyfluoroalkyl substances (PFAS) in drinking water treatment: A review", published in Water Research, vol. 50, 2014, pp. 318-340. (Year: 2014).*
Zhou, "Gemini Surfactant-Modified Activated Carbon for Remediation of Hexavalent Chromium from Water", published in Water, Special-Issue-Heavy Metals and Potentially Toxic Elements (PTEs) in Water, published Jan. 18, 2018. (Year: 2018).*
English Translation of patent publication JP 2002282848A, published Oct. 2, 2002 (Year: 2002).*
International Search Report and Written Opinion of the International Searching Authority issued for corresponding International Patent Application No. PCT/US2019/046540, dated Nov. 5, 2019, 8 pages.
Yu, J et al. "Adsorption of Perfluorinated Compounds onto Activated Carbon and Activated Sludge" Journal of Environmental Engineering © ASCE; Oct. 2011; abstract. 8 Pages.
Lutes, CC et al. "Tailored Granular Activated Carbon Treatment of Perchlorate in Drinking Water" ESTCP Project ER-200546; Oct. 2010; p. 19, second paragraph. 67 Pages.
Vizhemhr, AK "Predicting the Performance of Activated Carbon Filters at Low Concentrations Using Accelerated Test Data" Thesis Concordia University Montreal, Quebec, Canada; Aug. 2014; abstract; p. 12, first paragraph. 54 Pages.
Parette R et al: "Removing low ppb level perchlorate, RDX, and HMX from groundwater with cetyltrimethylammonium chloride (CTAC) pre-loaded activated carbon", Water Research, Elsevier, Amsterdam, NL, vol. 39, No. 19, Nov. 1, 2005 (Nov. 1, 2005), pp. 4683-4692, XP027613701, ISSN: 0043-1354 [retrieved on Nov. 1, 2005] 10 Pages.
"Extended European search report", issued by the European Patent Office regarding related European patent application No. 19849938. 6, dated Feb. 24, 2022, 8 pages.

* cited by examiner

MODIFIED ACTIVATED CARBON AND METHODS OF USING SAME

CROSS-REFERENCE TO RELATED APPLICATION

This application claims the benefit of priority to U.S. Provisional Patent Application Ser. No. 62/718,764 as filed on Aug. 14, 2018 and titled "MODIFIED ACTIVATED CARBON AND METHODS OF PRODUCING SAME," the entire disclosure of which is hereby incorporated herein by reference in its entirety for all purposes.

FIELD OF THE TECHNOLOGY

One or more aspects relate generally to activated carbon for use in water treatment.

BACKGROUND

Activated carbon is widely used in gas purification, water purification, metal extraction, and sewage treatment among other applications. Activated carbon is generally a form of carbon that has been physically or chemically processed to increase its porosity and surface area available for adsorption and chemical reactions. Powdered activated carbon (PAC) and granular activated carbon (GAC) are among common forms.

SUMMARY

In accordance with one or more aspects, a method of treating water containing per- and polyfluoroalkyl substances (PFASs) is disclosed. The method may comprise providing an activated carbon bed comprising activated carbon loaded with a positively-charged surfactant, and introducing the water to the activated carbon bed to promote adsorption of the PFASs.

In some aspects, the PFASs may comprise perfluorooctane sulfonic acid (PFOS) or perfluorooctanoic acid (PFOA). The positively-charged surfactant may be a quaternary ammonium-based surfactant. The quaternary ammonium-based surfactant may be cetyltrimethylammonium chloride (CTAC). The activated carbon may be a granular activated carbon (GAC).

In some aspects, the method may further comprise introducing a product stream of the activated carbon bed to a downstream unit operation for further treatment. The method may further comprise monitoring a PFAS breakthrough level downstream of the activated carbon bed. The method may further comprise predicting when the PFAS breakthrough level will exceed a predetermined threshold value. The method may further comprise bringing a second activated carbon bed online in response to a predicted PFAS breakthrough time. The method may further comprise regenerating the activated carbon. The method may still further comprise reloading the regenerated activated carbon with the positively-charged surfactant.

In accordance with one or more aspects, a water treatment system is disclosed. The system may comprise an activated carbon bed comprising activated carbon treated with a positively-charged surfactant, and a source of water comprising PFASs fluidly connected to an inlet of the activated carbon bed.

In some aspects, the PFASs may comprise perfluorooctane sulfonic acid (PFOS) or perfluorooctanoic acid (PFOA). The positively-charged surfactant may be a quaternary ammonium-based surfactant. The quaternary ammonium-based surfactant may be CTAC. The activated carbon may be a granular activated carbon (GAC). The activated carbon may be substantially mesoporous. The activated carbon may be a virgin or reactivated carbon material. The activated carbon may be made from bituminous coal, coconut-shell, or anthracite coal.

In some aspects, the system may further comprise a PFAS sensor positioned downstream of the activated carbon bed. The system may further comprise a controller in communication with the PFAS sensor and configured to predict a number of bed volumes remaining until a PFAS breakthrough level will exceed a threshold value. The controller may be configured to generate a service request based on the number of bed volumes remaining. In at least some aspects, performance measured as bed volumes to breakthrough may be at least doubled or at least tripled in comparison to a system including untreated activated carbon.

The disclosure contemplates all combinations of any one or more of the foregoing aspects and/or embodiments, as well as combinations with any one or more of the embodiments set forth in the detailed description and any examples.

BRIEF DESCRIPTION OF THE DRAWINGS

Certain illustrative features and examples are described below with reference to the accompanying figures in which.

Figure 1:
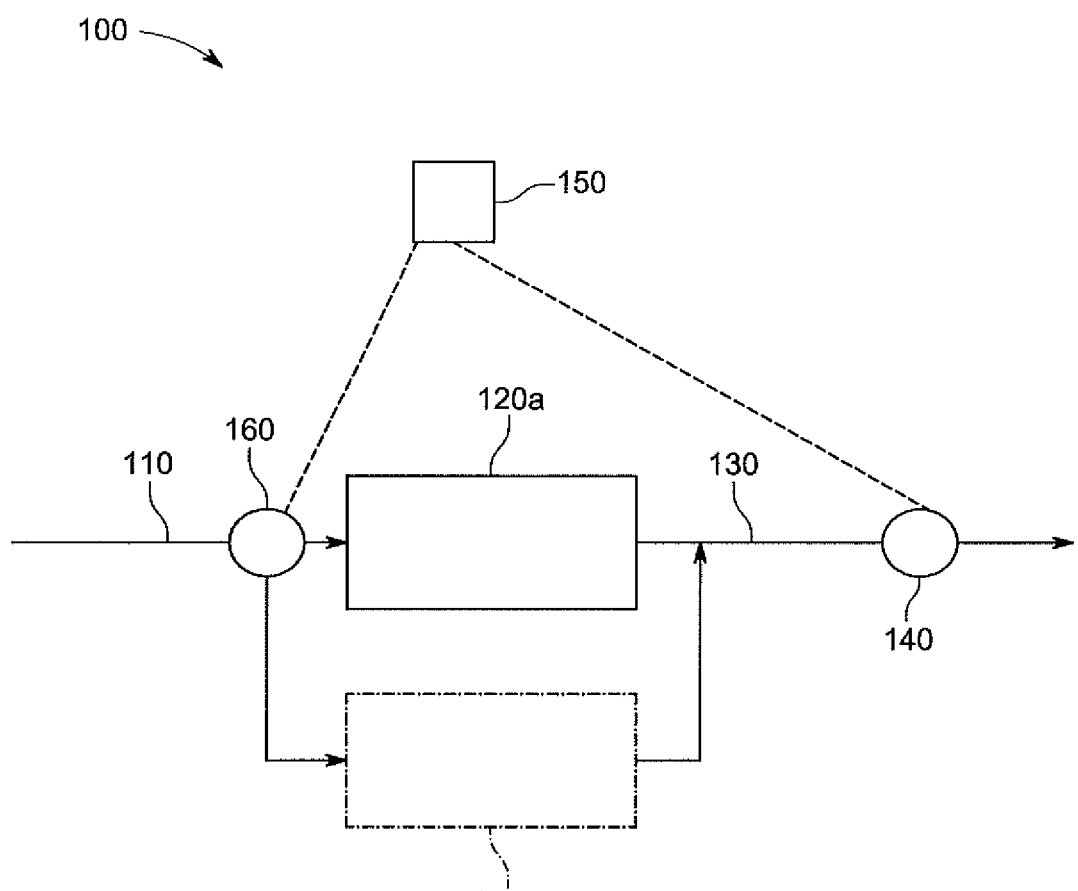
FIG. 1 presents a schematic of a water treatment system in accordance with one or more embodiments.

It will be recognized by the person of ordinary skill in the art, given the benefit of this disclosure, that the figures are purely for illustrative purposes. Other features may be present in the embodiments disclosed herein without departing from the scope of the description.

DETAILED DESCRIPTION

In accordance with one or more embodiments, activated carbon may be used to treat water. In some embodiments, activated carbon may be applied for the removal of various negatively-charged contaminant molecules. Notable amongst such molecules are per- and polyfluoroalkyl substances (PFASs), also referred to as perfluorinated chemicals (PFCs), that are present in wastewater. These man-made chemical compounds are very stable and resilient to breakdown in the environment. They may also be highly water soluble because they carry a negative charge when dissolved. They were developed and widely used as a repellant and protective coating. Though they have now largely been phased out, elevated levels are still widespread. For example, water contaminated with PFAS or PFC may be found in industrial communities where they were manufactured or used, as well as near airfields or military bases where firefighting drills were conducted. PFAS or PFC may also be found in remote locations via water or air migration. Many municipal water systems are undergoing aggressive testing and treatment.

In some non-limiting embodiments, activated carbon may be applied for the adsorption of PFAS or PFC in water. In some embodiments, cationic PFAS of PFC levels in water may be addressed. In some specific non-limiting embodiments, common PFCs such as perfluorooctanoic acid (PFOA) and/or perfluorooctane sulfonic acid (PFOS) may be removed from water via an activated carbon treatment operation. The U.S. Environmental Protection Agency (EPA) developed revised guidelines in May 2016 of a combined lifetime exposure of 70 parts per trillion (PPT) for PFOS and PFOA. Federal, state, and/or private bodies may also issue relevant regulations. In some embodiments, other approaches for PFC removal, such as the use of ion exchange resin, may be used in conjunction with activated carbon treatment as described herein.

While any organic portion of PFCs may be large enough to allow for sufficient adsorption, the presence of a negative charge greatly reduces carbon performance.

In accordance with one or more embodiments, activated carbon may be modified in order to facilitate and/or promote the removal of negatively-charged contaminant molecules, such as PFCs from water. The performance of activated carbon in terms of PFC, i.e. PFAS, adsorption may be greatly improved via the techniques disclosed herein. In some embodiments, carbon performance measured as bed volumes to breakthrough may be at least doubled or at least tripled.

In accordance with one or more embodiments, the water solubility associated with the negative charge carried by most dissolved PFCs, i.e. PFAS, may be countered via modification of activated carbon used in water treatment operations. Activated carbon may be loaded or conditioned with any positively-charged compound to promote direct interaction with the negative charge associated with PFCs. A measurement of surface charge may therefore confirm that the disclosed material modification was implemented. In some non-limiting embodiments, the modification may provide a functionalized activated carbon material which exhibits a positive surface charge greater than about 0.09 milliequivalents/gram, as measured in accordance with the Surface Charge Titration Protocol at a pH of 7.5. In some embodiments, activated carbon may be coated with a positively-charged surfactant. The presence of cationic surfactant on the activated carbon may therefore confirm that the disclosed material modification was implemented. In some embodiments, the surfactant may be approved for use in connection with consumable products such as drinking water. In some non-limiting embodiments, the activated carbon may be treated with a quaternary ammonium-based surfactant. In some specific non-limiting embodiments, activated carbon may be surface coated with cetyltrimethylammonium chloride (CTAC).

In accordance with one or more embodiments, any activated carbon may be used as the starting material for modification as described herein. The activated carbon may be PAC or GAC. In some embodiments, GAC may be preferred for PFOA and PFOS treatment. Various mesh sizes may be implemented. For example, GAC may be activated carbon with particle sizes predominantly greater than 80 mesh. Various carbon types may also be implemented. For example, the carbon may be made from bituminous coal, coconut shell, or anthracite coal. The carbon may be virgin activated carbon. In other embodiments, the carbon may be reactivated carbon. In some embodiments, the starting material may be made from bituminous or sub-bituminous carbon. In other embodiments, coconut-shell based activated carbon may be used. In at least some embodiments, spent activated carbon may be thermally reactivated. While the coating described herein would likely be destroyed during thermal reactivation, it can be reapplied to a reactivated carbon prior to reintroducing an associated carbon bed into service.

In accordance with various non-limiting embodiments, the starting material to be modified may be an activated carbon as described in U.S. Pat. Nos. 8,932,984 and/or 9,914,110, both to Evoqua Water Technologies LLC, each of which hereby being incorporated herein by reference in its entirety for all purposes. The activated carbon may be Westates® carbon commercially available from Evoqua Water Technologies LLC. In some specific embodiments, the activated carbon may be an AquaCarb® liquid phase carbon commercially available from Evoqua Water Technologies LLC. Selection of an activated carbon material may be based on its physical properties as well as its capability for selectively adsorbing various organic and inorganic materials to meet specific water purification requirements.

In accordance with one or more embodiments, a microporous activated carbon, a mesoporous activated carbon, or an activated carbon having any ratio of microporous to mesoporous structure may be modified. In at least some embodiments, a mesoporous activated carbon may be used. For purposes of one or more disclosed embodiments, the term micropore refers to a pore of about 2 to about 20 Angstroms in diameter while the term mesopore refers to a pore of about 20 to about 500 Angstroms in diameter based on definitions commonly known to those skilled in the art and as adopted by the International Union of Pure and Applied Chemistry (IUPAC). Percentages relating to micropore volume and mesopore volume, or percentages in conjunction with the terms microporous and mesoporous, used above and throughout may generally refer to percentage of total pore volume as calculated from gas adsorption isotherms and as commonly recognized by those skilled in the art.

In accordance with one or more embodiments, various techniques known to those skilled in the relevant art may be implemented in terms of treating the activated carbon. For example, a set volume of material, i.e. CTAC, at a specified concentration may be recirculated through a carbon bed for a predetermined period of time and at a predetermined contact time to achieve a desired degree of loading. Column size and/or volume may be controlling factors. The activated carbon may also be coated or treated with other approaches. The treated or modified activated carbon may then be applied for water treatment.

In accordance with one or more non-limiting embodiments, wastewater may be contacted with modified activated carbon, i.e. in GAC form, in a semi-batch or continuous process. In some non-limiting embodiments, fixed bed, expanded bed, moving bed or fluidized bed adsorption processes may be used in conjunction with the modified activated carbons discussed herein. Various factors may impact contactor design including particle size, column diameter, flow rate of incoming wastewater, residence time, adsorption bed height, pressure drop and breakthrough time. In general, as the wastewater moves through the activated carbon, pollutants may be adsorbed via movement from the wastewater to the carbon bed. The overall adsorption process may be dominated by a mass transfer step from the wastewater bulk to the surface of the carbon particle through the boundary layer surrounding the particle. Internal diffusion through the carbon pores and adsorption onto the surface of the particle may also be involved.

In accordance with one or more embodiments, product water treated with a modified activated carbon as described herein may be potable. In at least some embodiments, modified activated carbon as described herein may find utility in the municipal water treatment market and may be used to produce drinking water. The disclosed techniques may be integrated with one or more pre- or post-treatment unit operations. For example, a modified activated carbon may be used in conjunction with another activated carbon treatment operation and/or other water treatment technique such as ion exchange.

FIG. 1 presents a schematic of a water treatment system 100 in accordance with one or more embodiments. Process stream 110 containing an elevated level of PFAS/PFC is introduced to GAC unit 120a for treatment. GAC unit 120a may include modified activated carbon as described herein. Various pre-treatment and/or post-treatment unit operations may also be integrated into system 100. Product stream 130 may be directed to a further unit operation for additional treatment, sent to a point of use, or otherwise discharged. Sensor 140 may measure a level of PFAS/PFC downstream of GAC unit 120a. A controller 150 may receive input from sensor 140 in order to monitor PFAS/PFC levels, intermittently or continuously. The controller may monitor for any identifiable presence of PFAS/PFC in product stream 130. Monitoring may be in real-time or with lag, either onsite or remotely. Beneficially, operation of system 100 can be conducted with confidence in that PFAS/PFC breakthrough levels are being monitored. For example, detecting an identifiable PFAS/PFC level may be indicative that a threshold or target level is approaching as may require maintenance or service. In some embodiments, the controller may predict how many bed volumes remain before a predetermined PFAS/PFC breakthrough level is reached. A detected PFAS/PFC level may be compared to a threshold breakthrough level that may be considered unacceptable, such as may be dictated by a controlling regulatory body. Maintenance decisions may be made based on such comparison. Various operational parameters including input concentration, flow rate, bed size, and empty bed contact time (EBCT) may also be factored into the determination by the controller. GAC unit 120 may be taken offline for preventative maintenance in response to a predicted PFAS/PFC breakthrough. A backup GAC unit 120b may be brought online, temporarily or otherwise, in anticipation of unacceptable breakthrough in connection with GAC unit 120a. Valve 160 may be in communication with controller 150 to strategically direct process stream 110 between GAC units 120a and 120b. Thus, two or more GAC units may be strategically operated in series or in parallel to efficiently treat elevated PFAS/PFC levels while avoiding deleterious breakthrough in accordance with various embodiments. In accordance with one or more embodiments, a controller which is monitoring PFAS/PFC breakthrough levels may be in communication with a service provider, such as to schedule system maintenance, activated carbon bed replacement, and/or activated carbon bed regeneration. In accordance with at least some embodiments, a controller may collect and/or report data pertaining to PFAS/PFC levels associated with a water treatment system. This data may be input to a service network.

A monitoring system may be utilized to gather data from the water treatment system and may provide the gathered data to operators local to the water treatment system or to persons, for example, a water treatment system service provider, remote from the water treatment and monitoring system. The monitoring system may analyze data to determine when service is required and/or create a service schedule. For example, the monitoring system may schedule service based on an estimated number of bed volumes remaining until a threshold breakthrough level is achieved. Projected bed volumes remaining may be compared to a setpoint. If the projected bed volumes remaining is less than the set point, then service may be scheduled. Historical data may also be input to the controller for predictive purposes. Anticipated service lag time may also be a factor.

The function and advantages of these and other embodiments will be more fully understood from the following example. The example is intended to be illustrative in nature and is not to be considered as limiting the scope of the materials, systems, and methods discussed herein.

EXAMPLE

An activated carbon sample was treated with a 0.04% weight solution of CTAC by recirculating a set volume of the material through a carbon bed overnight at a contact time of approximately 0.1 minutes for a small-scale bed with 170×200 carbon grains and a volume of 0.36 mL. Loading was anticipated to be 0.25 grams CTAC per gram of GAC. The column was characterized by an empty bed contact time (EBCT) of 10 minutes.

Figure 2:
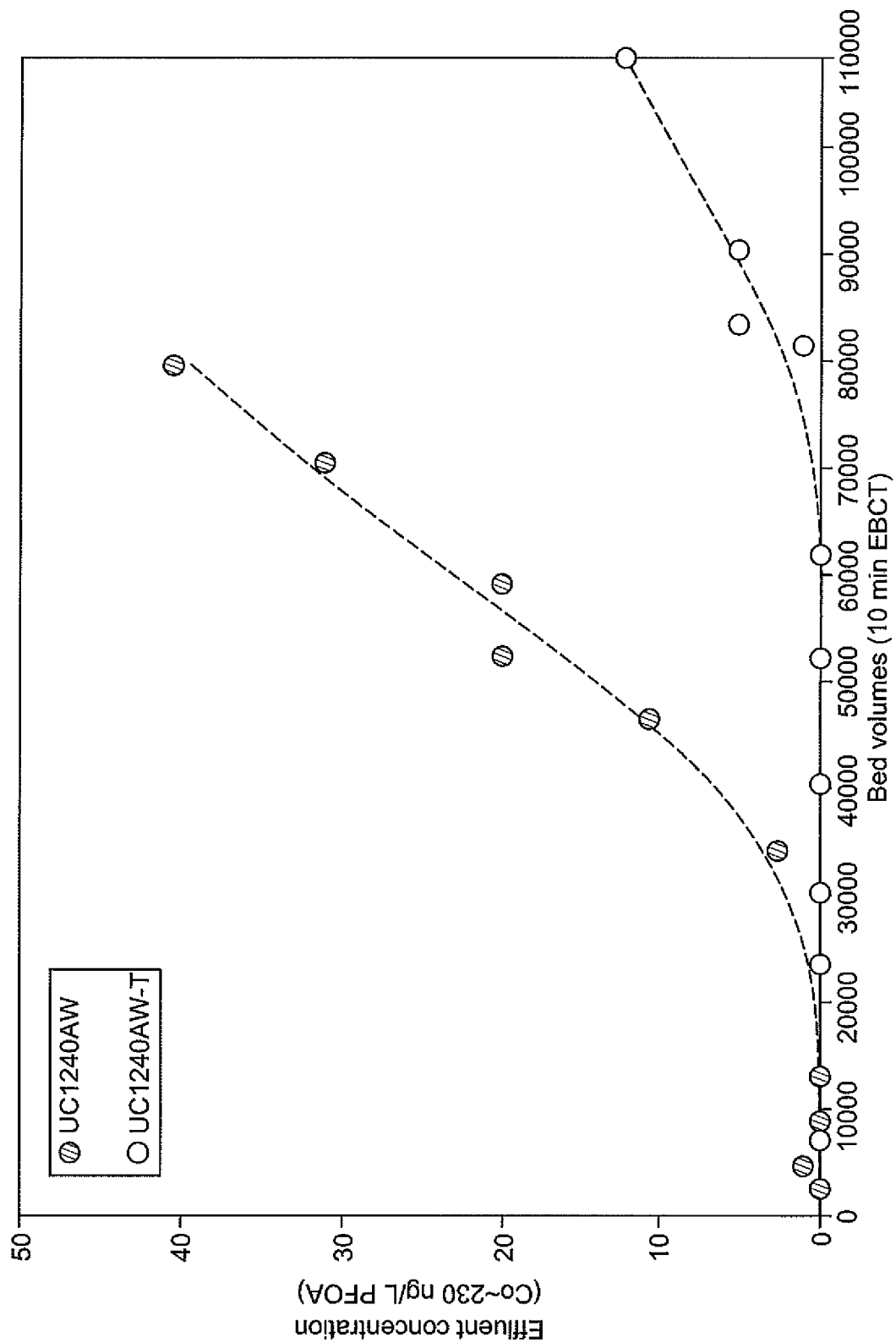
FIG. 2 presents comparative breakthrough data as discussed in the accompanying Example.

The treated column was then applied for the removal of PFOA at a concentration of roughly 230 ng/L from groundwater. Comparative breakthrough curves are presented in FIG. 2 which compares the performance of treated (UC1240AW-T) and untreated (UC1240AW) ULTRAC-ARB® 1240AW coal-based granular activated carbon commercially available from Evoqua Water Technologies LLC. Time to initial breakthrough at a level of 1 ng/L increased from about 25,000 bed volumes to about 80,000 bed volumes with treatment of the activated carbon. The rate of breakthrough was also considerably slower, meaning that the advantage of the treated material increased as the bed was operated to a higher level of breakthrough. Similar results were to be expected in connection with other PFAS/PFC.

Having now described some illustrative embodiments, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. A method of treating water containing perfluoroalkyl and/or polyfluoroalkyl substances (PFASs), comprising:
   providing a first activated carbon bed comprising granular activated carbon (GAC) directly coated with an effective amount of a positively-charged surfactant;
   monitoring PFAS concentration of the water containing PFASs;
   introducing the water containing PFASs to the first activated carbon bed to promote adsorption of the PFASs and produce a product stream comprising treated water;
   monitoring a PFAS breakthrough level in the product stream; and
   bringing a second activated carbon bed comprising the GAC directly coated with the positively-charged surfactant online in anticipation of a predicted PFAS breakthrough time when the PFAS breakthrough level will exceed a predetermined threshold value.

2. The method of claim 1, wherein the PFASs comprise perfluorooctane sulfonic acid (PFOS) or perfluorooctanoic acid (PFOA).

3. The method of claim 1, wherein the positively-charged surfactant is a quaternary ammonium-based surfactant.

4. The method of claim 3, wherein the quaternary ammonium-based surfactant is cetyltrimethylammonium chloride (CTAC).

5. The method of claim 4, wherein the GAC of the first activated carbon bed is directly coated with at least 0.25 grams of cetyltrimethylammonium per gram of activated carbon.

6. The method of claim 1, further comprising introducing the product stream of the first activated carbon bed to a downstream unit operation for further treatment.

7. The method of claim 6, wherein the downstream unit operation comprises at least one of an activated carbon treatment and an ion exchange treatment.

8. The method of claim 1, further comprising regenerating the GAC of the first activated carbon bed to produce a regenerated GAC.

9. The method of claim 8, further comprising directly coating the regenerated GAC with the positively-charged surfactant.

10. The method of claim 1, wherein the PFAS level of the water containing PFASs is at least 230 ng/L and the predetermined threshold value is 1 ng/L.

11. The method of claim 1, wherein the predetermined threshold value is a factor of one or more of the PFAS concentration of the water containing PFASs, flow rate of the water containing PFASs, bed size of the first activated carbon bed, and empty bed contact time of the first activated carbon bed.

12. The method of claim 1, wherein the predetermined threshold value is selected considering historical data.

13. The method of claim 1, further comprising monitoring flow rate of the water containing PFASs.

14. The method of claim 1, further comprising generating a service request based on a number of bed volumes remaining within the predicted PFAS breakthrough time.

15. The method of claim 14, wherein the service request is generated based on anticipated service lag time.

16. The method of claim 1, wherein performance of the first activated carbon bed measured as bed volumes to breakthrough is at least doubled in comparison to water treatment with an uncoated GAC.

17. The method of claim 1, wherein the coated GAC exhibits a positive surface charge greater than about 0.09 milliequivalents/g, as measured in accordance with a Surface Charge Titration Protocol at a pH of 7.5.

18. The method of claim 1, wherein the second activated carbon bed is in parallel with the first activated carbon bed.

19. The method of claim 1, wherein the second activated carbon bed is in series with the first activated carbon bed.

* * * * *